United States Patent
Turner, Jr.

[11] 3,730,549
[45] May 1, 1973

[54] DROP-AXLE SUSPENSION SYSTEM

[75] Inventor: Stephen Turner, Jr., Berlin Center, Ohio

[73] Assignees: Charles E. Wern, Jr.; David S. Dennison, Jr.; Stephen Turner, Jr., all of Warren, Ohio

[22] Filed: July 6, 1971

[21] Appl. No.: 160,125

Related U.S. Application Data

[62] Division of Ser. No. 12,050, Feb. 17, 1970.

[52] U.S. Cl..................280/124 F, 267/31, 267/54 R
[51] Int. Cl.................................................B60g 11/46
[58] Field of Search....................280/124 F; 267/18, 267/21, 23, 27, 31, 34, 65, 32, 54

[56] References Cited

UNITED STATES PATENTS

| | | | |
|---|---|---|---|
| 3,133,745 | 5/1964 | Granning | 280/112 R |
| 2,973,951 | 3/1961 | Billing | 267/54 A X |
| 2,853,325 | 9/1958 | Ward | 267/54 A X |

*Primary Examiner*—Philip Goodman
*Attorney*—Geoffrey R. Myers

[57] ABSTRACT

There is provided in auxiliary axle suspension system for wheeled vehicles an improvement for insuring the safety of said suspension when under heavy load, particularly about 6,000 lbs. per axle or greater, which comprises an axle having mounted at its outer extremities two wheels on either side thereof for carrying such a heavy load along the path of travel of the vehicle. Inwardly of each pair of wheels and immediately adjacent to each respective pair of wheels there is provided a leaf spring of a plurality of leaves and means for connecting the leaf spring at about its respective ends to the longitudinal I-beam frame members of the vehicle and extending longitudinally on either side thereof. Each leaf spring has its intermediate portion overlying and being secured by bolt means to the axle such that the leaf springs are normally biased upwardly to raise the axle and the wheels mounted thereon above the surface along which the vehicle travels. Juxtapositioned between each leaf spring and its respective frame member is at least one vertically flexible pneumatic chamber which may be expanded or contracted vertically by applying pneumatic pressure thereto to thereby bias the axle downwardly against the force exerted by the springs to lower the wheels mounted thereon into contact with the vehicle travel surface. Torque arms are provided which extend in the forward direction of the vehicle and are connected between the bolt means for connecting the axle to the frame member and the means for connecting each respective leaf spring at about their ends to the vehicle. In addition, the leaf springs are not secured to the means which connect them at about their ends to the frame member of the vehicle, but rather, are connected in a manner which allows them to slide longitudinally therewithin. Upon braking under heavy load, the leaf springs are protected from undue torque forces by the torque arms and the slidable nature of the leaf spring connection.

5 Claims, 5 Drawing Figures

PATENTED MAY 1 1973        3,730,549

← FORWARD

DROP-AXLE SUSPENSION SYSTEM

CROSS-REFERENCE TO OTHER APPLICATIONS

This application is a division of copending U.S. Pat. application Ser. No. 12,050 filed Feb. 17, 1970.

This invention relates to wheeled vehicles having auxiliary axle suspension systems therein. More particularly, this invention relates to an improved modification of the wheeled vehicle in combination with a suspension system as disclosed in applicant's U.S. Pat. No. 3,285,621 issued Nov. 15, 1966.

In applicant's aforementioned issued U.S. Pat. No. 3,285,621, there is disclosed a particularly unique and highly successful auxiliary axle suspension system for wheeled vehicles, which suspension system allows load carrying wheeled vehicles to overcome the troublesome problem of tire scuffing when a plurality of axles must be used to support the load in transit. The disclosure of this U.S. Pat. No. 3,285,621 is incorporated herein by reference.

As disclosed in this aforementioned patent, the problem of tire scuffing when a plurality of axles must be used to bear an unduly heavy load as the vehicle travels, is overcome by utilizing the principle of an auxiliary vehicle axle which is selectively shiftable toward and away from the road surface. Such an auxiliary vehicle axle provides for increased load capacity of the vehicle while minimizing tire scuffing, power consumption, and limitations on maneuverability of the vehicle. Generally speaking, the preferred embodiment as contemplated by this patent comprises a wheeled vehicle having longitudinally extending frame members in side-by-side relation and each frame member being disposed adjacent a respective side of the vehicle. There are then provided at least first and second axles underlying the frame members and extending transversely thereof, the axles being spaced from each other longitudinally of the vehicle and each mounting wheels along which the vehicle may travel. There is further provided a means connecting said first axle to said frame members whereby said first axle provides a primary means of vehicle support. Leaf springs are provided on each side of the vehicle adjacent their respective frame members and extending longitudinally thereof, each leaf spring having its end portion secured to respective frame members and having its intermediate portion overlying and secured to said second axle, said leaf springs cooperating to normally bias said second axle upwardly to raise the wheels mounted thereon above the surface along which the vehicle travels. There are then provided vertically flexible pneumatic chambers extending between respective frame members and said second axle, and means for selectively applying pneumatic pressure to said chambers to cause vertical elongation thereof, thus biasing said second axle downwardly against the force exerted by said springs to lower the wheels mounted thereon into forceable engagement with the vehicle travel surface. By release of the pneumatic pressure, the upwardly biased springs retract the wheels from engagement with the vehicle travel surface when the auxiliary second axle is no longer needed to bear the load.

As stated above, the invention of the aforementioned patent has been found extremely advantageous in overcoming the above troublesome problem especially in the semi-trailer and truck industry. It has, however, now been quite unexpectedly found that when the normal axle currently used in a truck or semi-trailer vehicle is called upon to carry a load of greater than about 6,000 lbs. and usually greater than about 14,000 lbs., a great amount of force, especially during the braking of the vehicle, is placed upon the ends of the leaf springs in the auxiliary axle combination, which force thus tends to be a source of potential danger when using this auxiliary axle system. In addition, it has been further quite unexpectedly found that if the vertically extending bracket means used to connect the outer ends of the leaf springs to their respective frame members of the vehicle are connected to these frame members, which are usually I-beams, such that they are connected by weld joints or by bolting through the flange portions of the I-beams, a further potential source of danger arises. In view of the heavy load being carried by the axle and the great force placed upon the bracket beams which connect the leaf springs to the frame member, weld joints have been found entirely inadequate to provide the necessary safety factor for the system. It has further been found, and quite unexpectedly, that if the flanges of the I-beam are violated by placing bolts therethrough, for some reason, probably metallurgical, the I-beam's strength is greatly weakened to the point where fracturing of the I-beam frame member may actually occur.

This invention solves the above problems presented in the prior art by a unique modification of the auxiliary axle suspension described and disclosed in U.S. Pat. No. 3,285,621 which enables said axle suspension to be useful for safely carrying heavy loads, especially those greater than about 6,000 lbs. per axle. The modification as contemplated by this invention generally comprises at least two torque arms separated from each other longitudinally along the length of said axle extending in the forward direction of the vehicle and being located between the axles and their respective means for connecting the leaf springs to the vehicle. The means for connecting the leaf springs to the vehicle are designed in such a manner as to allow the springs to slide longitudinally therewithin. In addition, the problem of I-bean frame member strength is overcome by providing a combination angle iron-bracket means which allows for bolts to connect same to the longitudinal vertically extending intermediate member of the I-beam frame member but because the flanges of said angle irons extend beyond the flanges of the I-beam, allow for securing of the flange members of the I-beam to the angled members without violating the metallurgical structure of the flanges of the I-beam. Thus, by utilizing the principle of an auxiliary axle as disclosed in U.S. Pat. No. 3,285,621 and modifying it in accordance with the teachings of this invention, not only are the advantages as disclosed in the subject patent achieved, but additional safety features allowing for greater load weights and improved axle alignment are also now possible. These and other advantages will become readily apparent from a study of the following description and from the drawings appended hereto, and in these drawings:

Figure 1:
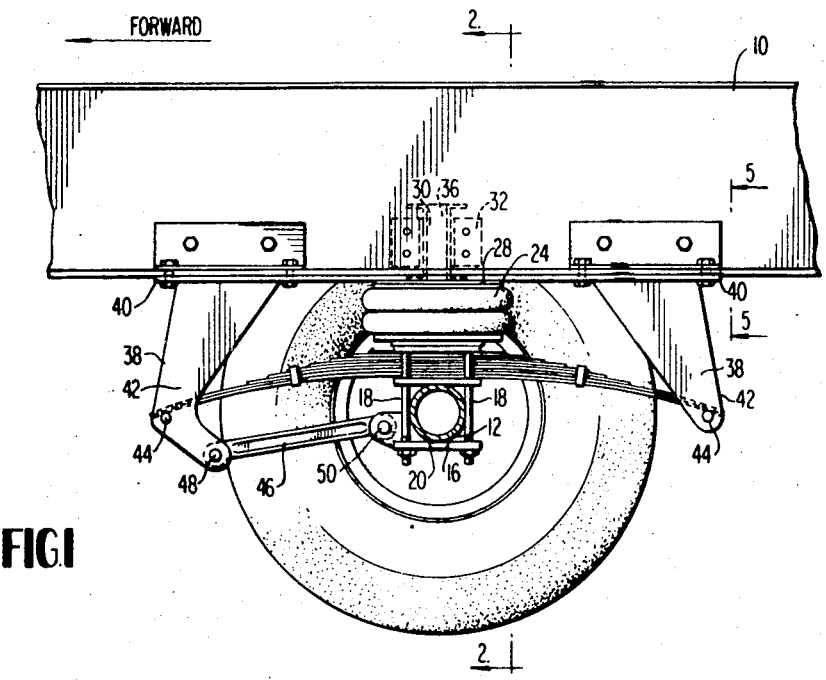
FIG. 1 is a side plan partially sectionalized view of an auxiliary axle suspension system contemplated by this invention.
Figure 2:
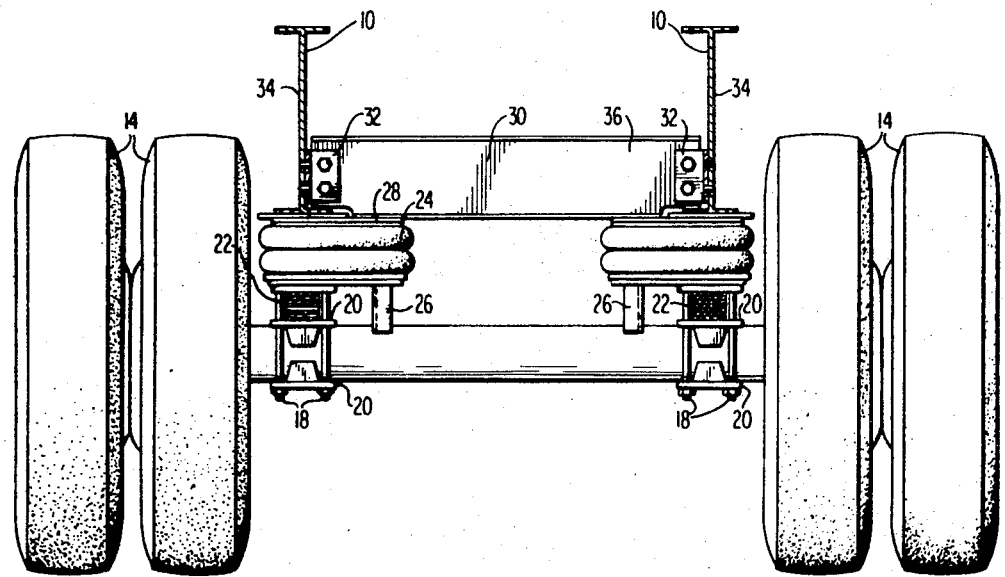
FIG. 2 is a rear cross-sectionalized view taken along lines 2—2 of FIG. 1.

With reference to FIGS. 1 and 2, there is illustrated a particularly preferred embodiment of the subject invention. I-beam vehicle frame members 10 are disposed longitudinally on either side of a vehicle (not shown for convenience) into which the subject inventive concept is to be used. The direction of forward motion of the vehicle is illustrated by the arrow located above FIG. 1. Axle 12 of conventional design has mounted at its outer extremities dual wheels 14. In a preferred embodiment of this invention, axle 12 is a hollow tube axle capable of bearing a 20,000 lb. load and is provided in accordance with conventional safety features with two wheels on either side rather than one wheel used for lighter loads. Axle 12 is connected to vehicle frame members 10 by a general block-bolt construction 16 comprised of vertically extending bolts 18 and horizontally securing plates 20.

To the top of the uppermost of plates 20 is attached by its intermediate portion a conventional leaf spring 22 formed of a plurality of leaves. As illustrated, and in accordance with the teachings of U.S. Pat. No. 3,285,621, leaf spring 22 is biased normally upwardly so as to hold wheels 14 out of engagement with the traveling surface of the vehicle.

Juxtapositioned between each of the leaf springs 22 and its respective I-beam vehicle frame member is a pneumatic chamber 24 which may be of any well known type, but which is preferably of a bellows or air bag construction as illustrated. Pneumatic chamber 24 rests upon the leaf springs 22 and axle 12 by a platform construction 26 as best illustrated in FIG. 2. Pneumatic chambers 24 are then securingly bolted to I-beam vehicle frame members 10 by, in order, plates 28 which are connected to lateral I-beam 30 which in turn is bolted to members 10 by angle irons 32. It is noted that nowhere are the flanges of either longitudinally extending I-beam frame members 10 or laterally extending I-beam member 30 violated by bolts extending therethrough. Rather, all bolts are located either in vertical plates 34 of member 10 or vertical plate 36 of I-beam 30.

Leaf springs 22, in accordance with this invention, are connected at about their respective ends to frame member 10 by vertically extending bracket means 38. Vertically extending bracket means 38 consists of an upper lateral flange plate 40, a vertically extending section 42, and a leaf spring retaining means 44. Leaf spring retaining means 44 may be of any conventional design but as illustrated, preferably comprised of lower pins upon which the ends of leaf springs 22 reside. Thus, leaf springs 22 are free to slide longitudinally within their retaining means 44. It is, of course, understood that retaining means 44 within bracket means 38 are separated from each other at a distance insufficient such that leaf springs 22 can slip therefrom at any time during the operation thereof.

Further in accordance with this invention, and in order to take up the torque forces presented, for example, upon braking of the vehicle which normally would be placed upon the ends of leaf spring 22 but which because of the slidable nature of the retaining means 44 is no longer taken up by leaf springs 22, there is provided between block-bolt construction 16 and forward bracket 38 a forwardly extending torque arm 46 connected to bracket means 38 by rotatable pin connection 48 and connected to block-bolt construction 16 by rotatable pin connection 50. This torque arm construction also allows for readily adjustable alignment of the axle as an added advantage.

Figure 3:
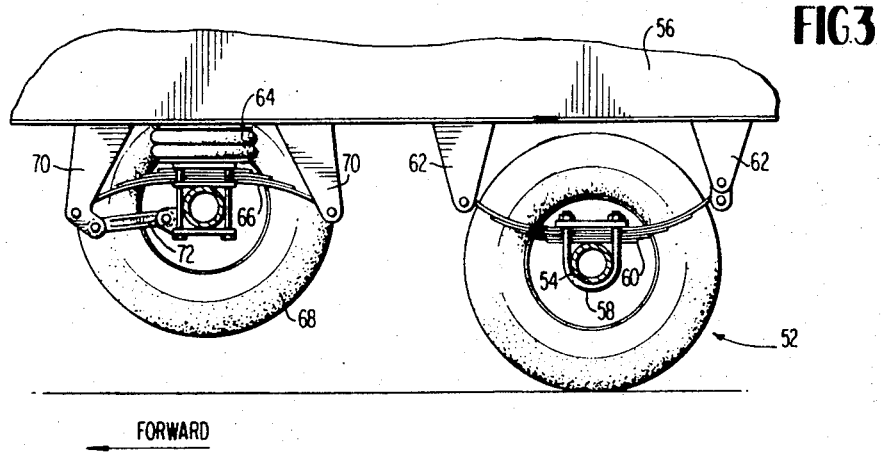
FIG. 3 is a side plan partially sectionalized view illustrating the axle system in use, in its retracted position, in a wheeled vehicle.
Figure 4:
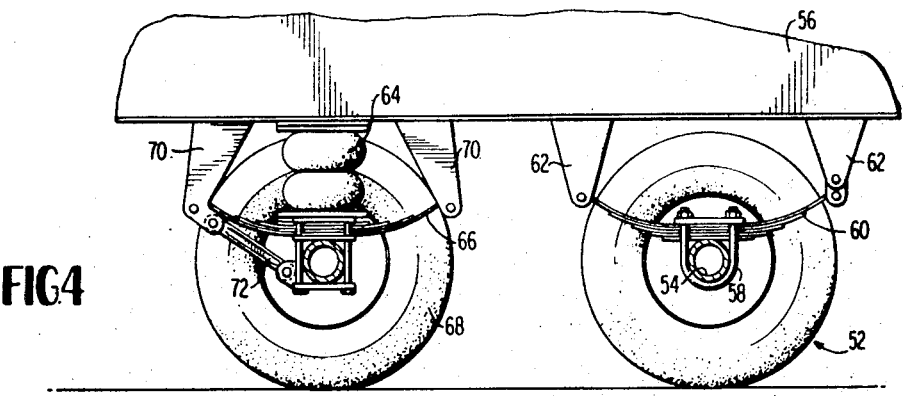
FIG. 4 is a side plan partially sectionalized view of the embodiment of FIG. 3 except that the axle syspension system is in its protruded position so as to place the wheel in contact with the travel surface.

Referring to FIGS. 3 and 4, the operation of the unique auxiliary axle suspension system of this invention is illustrated. In these Figures there is depicted the rearward portion of a truck or semi-trailer having a primary axle support means and forward thereof the unique axle system of the subject invention. In conventional manner, primary axle support means 52 comprises a conventional hollow axle 54 connected to I-beam frame member 56 by a U-bolt construction 56. U-bolt construction 58 connects axle 54 to the intermediate portion of a downwardly biased conventional leaf spring 60 formed of a plurality of leaves and having its outer ends connected to vertically extending bracket means 62. It is, of course, understood that in accordance with this invention, bracket means 62 shall be securingly engaged to I-beam 56 by the unique connecting construction as contemplated by this invention, and not by the connection means which cause a safety problem as discussed above.

When the vehicle as illustrated in FIGS. 3 and 4 is unloaded or is under light load such that an auxiliary axle is not required, then in accordance with FIG. 3, pneumatic pressure is relieved from bellows 64 such that leaf spring 66, in its normally upwardly biased position retracts wheel 68 from the travel surface of the vehicle. Referring to FIG. 4, and when the vehicle is under heavy load and thus requires the use of an auxiliary axle, pneumatic chambers 64 are inflated so as to push wheel 68 downwardly against the force of spring 66 and into engagement with the travel surface. As can be seen, because leaf springs 66 are retained in brackets 70 as described above so as to be longitudinally slidable therein, danger of leaf spring breakage during braking of the vehicle is avoided. As described above, the torque force presented upon braking of the vehicle is taken up by the safety feature of a torque arm 72 as illustrated.

Thus, as can be seen from the above description, the above improvement on the unique and highly successful invention described in U.S. Pat. No. 3,285,621 enables a wheeled vehicle, preferably a truck or semi-trailer, to obtain the advantages of the invention of U.S. Pat. No. 3,285,621 even though the truck or semi-trailer must carry an extremely heavy weight per axle such as about 6,000 lbs. per axle or greater. In addition, the particular combination contemplated by this invention as described above eliminates the need for shock-absorbers, thus eliminating not only an initial expense but the expense accompanying the constant servicing thereof.

Figure 5:
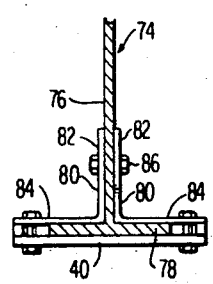
FIG. 5 is a cross-sectional view taken along line 5—5 of FIG. 1 illustrating a preferred embodiment of the means for securing said suspension to the frame members of the vehicle.

Referring to FIG. 5, there is now illustrated a preferred technique of securing a suspension member to an I-beam either laterally extending as in I-beam 30 or longitudinally extending as I-beams 10. For purposes of clarity, the discussion hereinafter will refer to a frame member of the wheeled vehicle, it being understood that such a discussion is equally applicable to the laterally extending I-beam 30 which connects the suspension system to the frame member.

Frame 74 is comprised of a vertical plate 76 and a horizontal flange 78. In order to securingly connect the suspension system of the subject invention to frame member 74 without using weld joints and without violating the metallurgical integrity of flanges 78, bracket means such as bracket means 38 are provided with a flange 40, which flange extends laterally beyond the extremities of flanges 78. In addition, there are provided two angle irons 80 having vertical legs 82 and horizontal legs 84. Vertical legs 82 abut vertical plate 76 on either side thereof while horizontal legs 84 abut the right and left portions of flange 78, but extend beyond the outer extremities of flanges 78. Vertical legs 82 are secured to interposed vertical plate 76 by bolt means 86 extending therethrough. Horizontal flange 40 of bracket means 38 is then connected to frame member 74 by bolting flange 40 to horizontal legs 84 at their portions which extend beyond the extremities of flanges 78, thus securingly bolting flange 40 to frame member 74 without violating the metallurgical integrity of I-beam flanges 78. In this manner, the advantages of a bolting mechanism rather than a welding joint and, at the same time, the safety of a non-violated I-beam flange are simultaneously achieved.

Once given the above disclosure, many other features, modifications and improvements will become apparent to the skilled artisan. Such other features, modifications and improvements are therefore considered to be a part of this invention, the scope of which is to be determined by the following claims.

I claim:

1. In a wheeled vehicle having a frame comprised of a least two flanged beams and an axle suspension connected to said flanged beams, the improvement comprising a device for connecting said axle suspension to the flanged beams of the frame of said wheeled vehicle comprising bracket means to which said axle suspension is connected, said bracket means including a lower vertically extending member and an upper horizontal flange laterally extending therefrom; said horizontal flange abutting the horizontal flange of said flanged beam and extending beyond the outer extremities of the flange of said flanged beam, means located on either side of the vertical member of said flanged beam and connected to its corresponding means on the other side of said vertical member by bolt means extending through said means and said vertical member of said flanged beam, at least one of said means being an angled member having a leg abutting the side of the flange of said flanged beam opposite that side abutted by said horizontal flange of said bracket means and being bolted to the portion of said abutting flange of said bracket means extending beyond the abutting flange of said flanged beam without being bolted to the lower flange of said flanged beam.

2. The improvement according to claim 1 wherein said axle suspension comprises an axle, at least two leaf springs spaced from each other longitudinally along the length of said axle, means for connecting the leaf springs at about their ends to said bracket means, each leaf spring having its intermediate portion being secured by means to said axle, said leaf springs cooperating to normally bias said axle upwardly to raise the wheels mounted thereon above the surface along which the vehicle travels, at least one vertically flexible pneumatic chamber extending between the vehicle and said axle, and means for applying pneumatic pressure to said chamber to cause vertical elongation thereof thus biasing said axle downwardly against the force exerted by said springs to lower the wheels mounted thereon into contact with the vehicle surface, said suspension not being provided with torque arms separated from each other longitudinally along the length of said axle and extending in the longitudinal direction of said vehicle between said axle and said bracket means.

3. The improvement according to claim 2 wherein said leaf springs are connected at about their ends to said bracket means by means which allow said springs to slide longitudinally therewithin.

4. The improvement according to claim 2 wherein said suspension includes at least two vertically flexible pneumatic chambers, each of said chambers being located between said vehicle and said intermediate portion of its respective leaf spring.

5. The improvement according to claim 2 wherein said leaf springs are comprised of a plurality of leaves.

* * * * *